Dec. 28, 1954 G. W. VON HOFE ET AL Re. 23,917

LABEL APPLYING MECHANISM

Original Filed Dec. 26, 1946 2 Sheets-Sheet 1

WITNESS

G. V. Rasmussen

INVENTORS

GEORGE W. VON HOFE

BY HANS A. NEFZGER

Klein, Alexander & Pohl

ATTORNEYS

Dec. 28, 1954 G. W. VON HOFE ET AL Re. 23,917
LABEL APPLYING MECHANISM
Original Filed Dec. 26, 1946 2 Sheets-Sheet 2
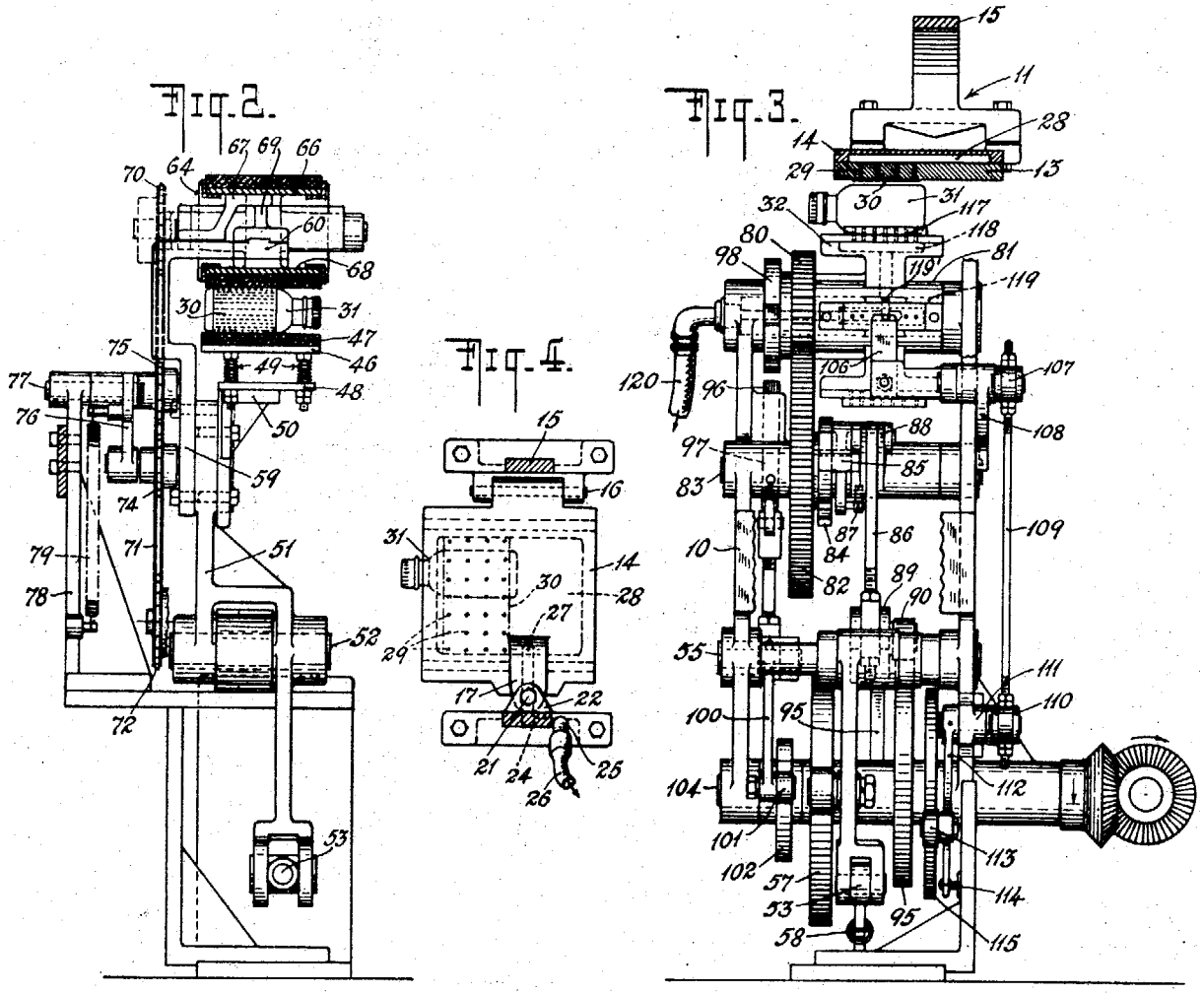
WITNESS
G. V. Rasmussen
INVENTORS
GEORGE W. VON HOFE
BY HANS A. NEFZGER
Klein, Alexander & Pike
ATTORNEYS United States Patent Office Re. 23,917

Reissued Dec. 28, 1954

23,917

LABEL APPLYING MECHANISM

George W. von Hofe, Bound Brook, and Hans A. Nefzger, Hackensack, N. J., assignors to New Jersey Machine Corporation, Hoboken, N. J., a corporation of New Jersey Original No. 2,525,504, dated October 10, 1950, Serial No. 718,484, December 26, 1946. Application for reissue May 29, 1952, Serial No. 290,844

36 Claims. (Cl. 216—55)

Figure 1:
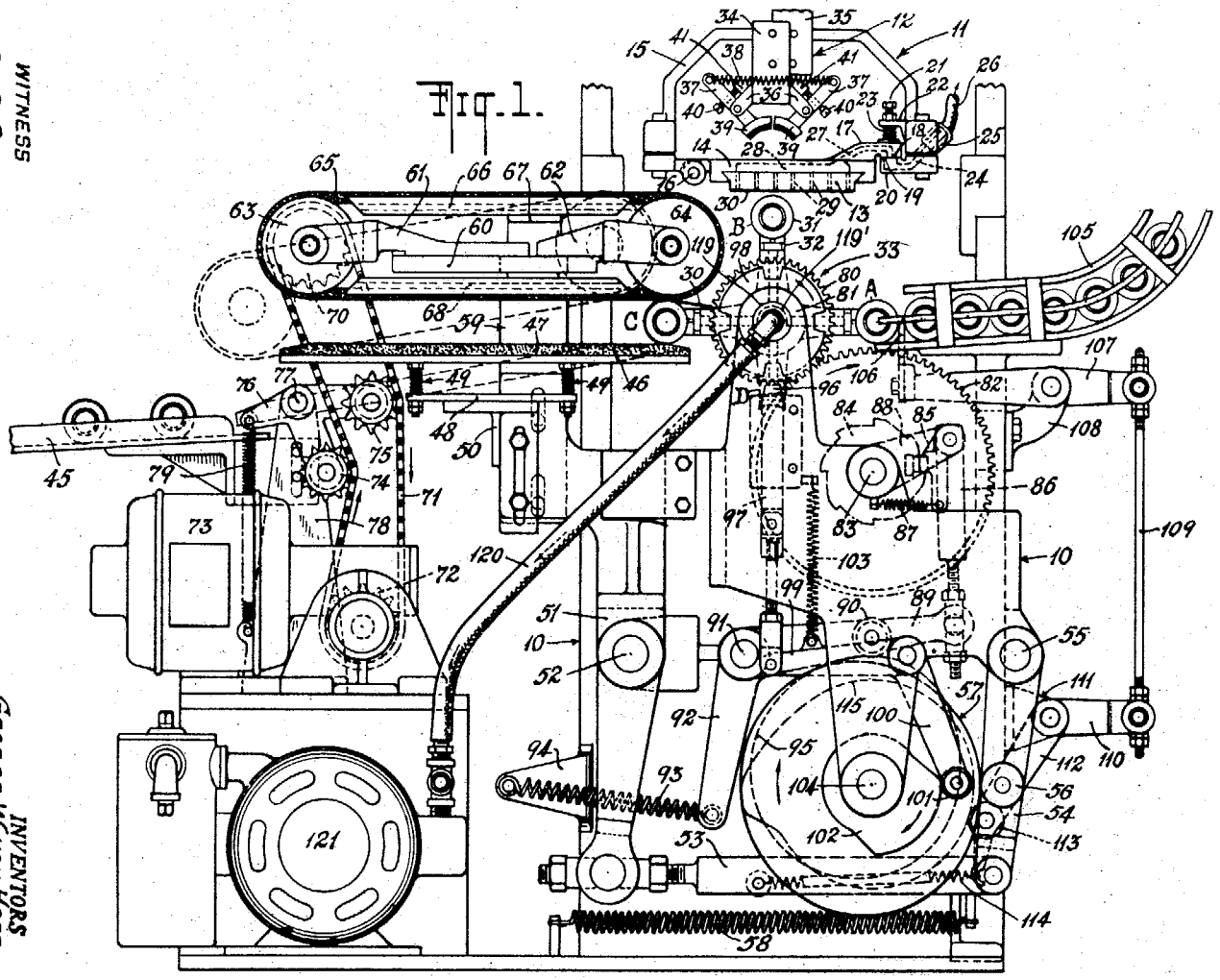

Matter enclosed in heavy brackets [ ] appears in the original patent but forms no part of this reissue specification; matter printed in italics indicates the additions made by reissue.

The invention relates to labeling machines and more particularly to the mechanisms in such machines for adhesively applying the labels to the articles for which they are intended.

The principal object of the invention is to provide a novel mechanism adapted to wrap labels in an efficient manner about the articles so as to envelope the latter to a predetermined extent.

The invention contemplates further the provision of a novel mechanism whereby the labels are applied circumferentially about articles to wholly envelope the same.

A further object of the invention is to provide a novel mechanism whereby the labels are applied circumferentially of articles of small dimensions, as exemplified by conventional ampules, to envelope the same.

Other objects of the invention, as well as the advantageous features of construction of the mechanism, will be apparent from the following description when read in connection with the accompanying drawings, in which Fig. 1 is a front elevational view of a labeling machine embodying the invention; Fig. 2 is a vertical sectional view, looking to the left of Fig. 1 of the belt mechanism contained in the machine; Fig. 3 is a side elevational view, partly in section, looking toward the right of Fig. 1, and Fig. 4 is a top plan view, partially in section, of the suction head for the labels.

The labeling machine, as such, may be of any well known type such as the machine described and illustrated in the Von Hofe Patent No. 2,227,816 issued January 7, 1941. In order that the construction and operation of the mechanism illustrated in the drawings may be more readily understood, it is deemed advisable to first point out generally, that in a machine such as shown in the said Von Hofe patent, there is provided a transfer means in the form of suction head which successively removes labels from the top of a supply stack and carries them to the label applying station of the machine. During the travel of the suction head from the supply stack to the label applying station, a coating of adhesive may be applied to the under surface of the label. At the label applying station, the suction head is lowered to apply the label carried thereby to the article, the suction in the head being so controlled, that when the label is deposited on the article, such suction is relieved. As the suction head is withdrawn to pick up another label, a pressure member is brought into engagement with the label deposited on the article to complete the adhesive application of such label to the article.

Turning now to the drawings, it may be first pointed out generally, that the frame 10 of the machine may be of a construction similar to the frame disclosed in the Von Hofe Patent No. 2,227,816, and that the suction head 11 and pressure device 12 may be supported and controlled by instrumentalities similar to those disclosed in said patent to accomplish the same cycle of operations performed by the suction head and pressure member, respectively, in the machine disclosed in such patent.

In accordance with the present invention, the suction head 11 includes a mouthpiece or plate 13 supported by a holder 14, which is mounted on the carriage frame 15 to pivot or turn about an axis 16 (note Figs. 1 and 4). The pivotal movement of the holder 14 is limited in the downward direction by an offset projecting portion 17 provided thereon and having a valve face 18 adapted to seat upon a valve face 19 formed on an inwardly projecting portion 20 of the carriage. The pivotal movement of the holder 14 is limited in the opposite or upward direction by a set screw 21 which is adjustably mounted on a bracket member 22, over the offset portion 17. The set screw 21 is locked in its adjusted position by a lock nut. Mounted on the set screw 21 intermediate the bracket member 22 and offset portion 17 is a compression spring 23 which normally maintains the valve faces 18 and 19 in engagement. Thus, the projecting portions 17 and 20, form what might be termed a clapper valve which is normally maintained closed by the spring 23. The portion 20 is provided with an interior passageway 24 which extends from its valve face 19 to a nozzle 25 and is in communication with a vacuum pump or other means for developing suction therein through a flexible tube 26. The portion 17 is provided with an interior passageway 27 which extends from its valve face 18 to a chamber 28 formed in the holder 14. Also communicating with the chamber 28 are a series of openings 29 provided in the mouthpiece 13 so as to be closed by a label 30 picked up from the stack.

It will be understood from the foregoing that in the normal operation of the machine, the clapper valve composed of the portions 17 and 20 will be closed and that labels will be removed from the stack by the suction head, carried to the label applying station and deposited upon the article (bottle 31) in the manner described in the Von Hofe Patent No. 2,227,816. However, should the bottle 31 receiving the label 30 be of slightly larger diameter than the bottle diameter for which the machine has been adjusted, the mouthpiece 13 would be stopped in its downward movement prior to the completion of the adjusted downward stroke of the suction head 11. This would cause the mouthpiece 13 to pivot about its axis 16 against the tension of spring 23, while the head 11 completed its downward stroke and as a result, would cause the disengagement of the valve faces 18 and 19, thus breaking the vacuum in passageway 27, chamber 28 and openings 29. With the vacuum thus broken, the label 30 which is in adhesive contact with the bottle 31 along a longitudinal line of the latter, would remain on the bottle as the suction head 11 is returned to its raised position. When in the return stroke of the head 11, the mouthpiece 13 is lifted from the bottle 31, the spring 23 will again bring together the valve faces 18 and 19 of the clapper valve, thus again completing the vacuum circuit to the channels 29 and enabling the head 11 to pick up another label from the label stack. This construction therefore enables the machine to apply labels to bottles whose diameters vary from the predetermined setting without any danger of breakage which would ordinarily occur, if the metal mouthpiece 13 were fixed to the suction head. The variance in any known set of bottles may be taken care of by adjustment of the set screw 21.

It will be observed from Fig. 1 of the drawings, that the bottle 31 rests on a seat provided on the outer end of one of four similarly constructed supporting members 32 forming part of a rotatable turret designated generally by the numeral 33. It will also be observed that the label 29 has a width approximately equal to the circumference of the bottle 31 and that at the label applying station of the turret (station B), the label will be applied by the head 11 to the bottle so that the line of adhesive contact will be nearer one edge of the label than the other. The purpose of so applying the label to the bottle, is to enable the pressure device 12 to adhesively secure one complete end portion of the label to the bottle without moving the latter, the label applying operation being completed at the next station of the turret (station C).

From Fig. 1 of the drawings, it will be seen that the pressure device 12 includes a block 34, carried by a plunger 35, vertically slidable in a guideway (not shown) provided in the upper portion of the frame and reciprocated in such guideway in properly timed relation with the other elements of the machine in the manner described in the Von Hofe Patent No. 2,227,816. Extending downwardly and outwardly from the sides of the block 34 are two bracket members 36, 36, which pivotally support intermediate their ends two lever members 37, 37. The upper ends of the lever members 37, 37 are connected by a spring 38 which normally tends to maintain the lower arcuately shaped ends or shoes 39, 39 of such members in a spread condition. The spread of the two members 37, 37 is limited by the coaction of the adjustable screws 40, 40 provided on the same, above their pivotal connection with the bracket members 36, 36, and the stops 41, 41 provided on the block 34. As a result of this construction, the shoes 39, 39 normally are slightly spaced from each other and together define an arc which has a greater radius than the bottle 31. Thus, when such shoes 39 are brought into engagement with the ampule or bottle 31, on the downward stroke of the pressure device 12, their first contact with the bottle will be at their inner opposed ends. As the device 12 continues its downward movement, the bottle 31 will cause such shoes to be moved inwardly and upwardly against the pressure of spring 38, thereby reducing the arc defined by such shoes and causing the latter to secure to the surface of the bottle, the area of the label which they overlie. The label engaging surfaces of the shoes 39, 39 are preferably made of rubber so that the entire area of the label covered by such shoes will be securely adhered to the surface of the bottle. As has been previously mentioned, the label when applied by the suction head 11 to the bottle is offset with respect to the longitudinal axis of the latter. This offset is sufficient to enable the left hand shoe 39 to completely secure the left hand end of the label, as viewed in Fig. 1 of the drawings, to the bottle, leaving the right hand end of such label, as viewed in such figure, free and unconnected to the bottle (note the bottle and label at station C of the turret).

In the next step-by-step movement of the turret, the bottle 31 with its partially adhered label 30 will be carried to station C where the label will be completely wrapped around the bottle and the thus labeled bottle fed to a stationary discharge chute 45. The apparatus for accomplishing these operations include a horizontal table 46 provided on its upper surface with a layer 47 of rubber or other suitable material and yieldingly mounted on a plate 48 by means of the bolts and spring assemblies designated generally by the numerals 49, 49 in Figs. 1 and 2 of the drawings. The plate 48 is mounted on a bracket 50 adjustably secured to the vertically disposed upper arm of a lever 51 mounted intermediate its ends for pivotal movement about the axis of a shaft 52. The lower end of lever 51 is connected by an adjustable link 53 to the lower end of a link 54 mounted at its upper end for pivotal movement about the axis of a supporting member 55 secured to the frame of the machine. Mounted on the link 54 intermediate its ends, is a cam roller 56 which bears against the outer surface of a cam 57 under the influence of a spring 58 connected at one end to a post provided on the adjustable link 53 adjacent to the connection of such link with link 54, and connected at its other end to a fixed post provided on the base of the machine adjacent to the lower end of link 51. The cam 57 is so formed that the cam roller 56 will be forced outwardly against the tension of spring 58 just prior to the next step-by-step movement of the turret 33 to cause lever 51 to be rotated in a counter-clockwise rotation as viewed in Fig. 1 of the drawings, through links 53 and 54, to tilt table 46 to the dotted line position shown in Fig. 1 of the drawings. In this position of table 46, the entry end thereof will be shifted slightly from under a bottle carried to station C of the turret 33 while the discharge end thereof will be lowered to a position overlying the entry end of the chute 45. The cam 57 will maintain the table 46 tilted during the movement of turret 33 and after such movement has been completed, will permit the return of the table to its normal horizontal position under the influence of spring 58. Cam 57 is mounted on the main drive shaft 104 of the machine which is driven in any suitable manner from a continuously running motor (not shown).

Also adjustably mounted on the upper arm of lever 51 is a standard 59 having a horizontally disposed upper portion which is enlarged in a transverse direction to provide a supporting base 60 for the conveyor parts now to be described. Mounted on the base 60 are a pair of oppositely disposed brackets 61, 62 which serve as bearing supports for the shafts of the driven roll 63 and the idler roll 64, respectively. The rolls 63 and 64 carry an endless belt or conveyor 65 made of rubber or any other suitable material. The upper portion of the belt 65, intermediate the rolls 63 and 64, is supported by a flanged guide plate 66 which is mounted on a bracket 67 secured to the upper end of the standard 59. The lower portion of the belt 65, intermediate the rolls 63 and 64, moves along a guideway formed by the flanged plate 68 which is secured to depending projections formed on the base 60. Intermediate the base 60 and the guide plate supporting end of bracket 67 is a spacer 69 which rigidifies the conveyor structure and maintains the spaced parallel relation of the guide plates 66 and 68.

It will be understood from the previous description with relation to table 46, that when the cam 57 mounted on drive shaft 104 causes the upper end of lever 51 to be tilted, the above described conveyor mechanism together with standard 59 will be tilted as a unit with table 46, to the dotted line position shown in Fig. 1 of the drawings. During the rotational movement of the turret 33, the table 46 and conveyor 65 will be maintained by the cam 57 in tilted position. When the turret 33 comes to rest, the conveyor 65 and table 46 will be returned as a unit to their normal spaced horizontal positions. The belt 65 is continuously driven during the operation of the machine by mechanism which includes a sprocket wheel 70 secured to the shaft to which is fixed the roll 63. The sprocket 70 supports the upper end of a chain 71 which at its lower end is in engagement with a sprocket wheel 72 driven by the motor 73. The chain 71 is of such length as not to interfere with the tilting movements of the conveyor unit and it is maintained in driving relation with the sprockets 70 and 72 during such movements of the conveyor unit by a pair of idler sprocket wheels 74 and 75 which engage with the intermediate portions thereof. The sprocket wheels 74 and 75 are mounted on the ends of two arms of a lever 76 which is pivotally mounted on a stub shaft 77 carried by the upper end of a standard 78 secured to the frame of the machine. A third arm of the lever 76 is connected to the upper end of a vertically disposed spring 79 whose lower end is connected to a post provided on the standard 78. The tension of spring 79 maintains the idler sprocket wheels 74 and 75 biased against the intermediate portions of chain 71 to prevent any slack in such portions during the movements of the conveyor unit.

It is believed to be clear from the foregoing, that the belt 65 is continuously driven by the motor 73 during the operation of the machine and that the lower portion of such belt during its movement is maintained in predetermined, spaced, parallel relation to the table 46 by the flanged guide plate 68. During the dwell periods of the turret 33, the table 46 and belt 65 are positioned horizontally with their entry ends underlying and overlying respectively, the outer end of the holder 32 located at station C of the turret, while just prior to the rotational movements of the turret and during the periods of such movements, the table 46 and belt 65 will be tilted as a unit in the manner previously described, to the dotted line position shown in Fig. 1 of the drawings. With the table 46 and belt 65 so tilted, the turret is enabled to move freely a holder 32 with a bottle 31 thereon, from station B to station C. At the end of such movement of the turret, the table 46 and belt 65 are moved back to their horizontal positions where the entry ends thereof will engage diametrically opposed surface portions of the bottle brought into position at station C. The table 46 and belt 65 are preferably so adjusted on the machine that when the entry ends of their horizontal portions engage with the bottle, as shown in Fig. 1 of the drawings, they will exert on the bottle a clamping or frictional grip sufficient to overcome the suction exerted on the bottle through its associated holder 32. The direction of movement of the underside of the belt 65 is to the left, as viewed in Fig. 1 of the drawings, and away from the holder 32 so that when the bottle is removed from its associated holder 32, it is caused to roll toward the discharge chute 45. During such rolling movement of the bottle the label thereof will be completely wrapped and secured about the bottle by the table 46 and belt 65. The speed of rotation of the belt 65 may be such that the bottle will be in position on the table 46 to be discharged to the chute 45 when the table and belt are next tilted, or the speed of belt 65 may be such that the bottle will not be discharged from table 46 until the turret 33 has completed a plurality of steps.

The turret 33 is given its step-by-step movements through reduction gearing composed of a gear 80 secured to the hub 81 of such turret (note Fig. 3), and an enlarged gear 82 mounted for rotational movement on shaft 83. Affixed to gear 82 is a ratchet wheel 84 whose teeth are engaged by a pawl 85 pivotally mounted on the upper end of the vertically disposed adjustable link 86 and maintained in engagement with the ratchet wheel 84 by a spring 87. The link 86 is connected at its upper end to the outer end of a link 88 rotatably mounted on the shaft 83 and is connected at its lower end to an arm 89 of a bell crank lever mounted for rotational movement on a shaft 91 carried by a bearing support mounted on the frame of the machine. The arm 89 of such lever also carries a cam roller 90 which engages with the peripheral surface of a cam 95 mounted on the drive shaft 104. The roller 90 is maintained in engagement with cam 95 by a spring 93 which is connected to arm 92 of said bell crank lever and to a post provided on a bracket 94 secured to the frame of the machine. The cam 95 is so formed that the turret 33, through gears 80, 82, sprocket wheel 84, pawl 85, link 86 and lever arm 89, will be rotated through 90° during a portion of each revolution of such cam 95, and then caused to dwell through the remainder of each revolution of the cam 95. During the periods of dwell of the turret 33, the later is locked in position by means of a latching member 96 provided on the upper end of a link 97 and adapted to engage with one of four recesses provided on a latch wheel 98. The wheel 98 is secured to gear 80 and hub 81 of the turret 33 and the four recesses thereof are aligned with the four bottle holders 32 provided on such turret, so that after each quarter revolution of turret 33, one of such recesses will be positioned at station D, in position to receive the latching member 96. The lower end of the adjustable link 97 is connected to arm 99 of a pivoted bell crank lever whose other arm 100 carries a cam roller 101 which engages the peripheral surface of a small cam 102 mounted on the drive shaft 104. The cam roller 101 is maintained in engagement with the cam surface of the cam 102 by means of a spring 103 which is secured at its lower end to arm 99 of such lever and is connected at its upper end to a post secured to the main frame of the machine. It will be noted that the cam 102 is so formed and positioned with relation to the cam 95 that cam 102 through the above described mechanism, causes the latching member 96 to move into engagement with a recess on the latch wheel 98 during the period of dwell of the turret 33 and causes the withdrawal of such member 96 from the latch wheel 98 during the rotational movement of the turret 33.

The bottles to be labeled are fed to the turret 33 at station A by a chute 105 whose discharge end is so positioned with relation to the bottle holder members 32 of such turret that when a member is positioned at station A of the turret, a bottle 31 will roll into engagement with the seating surface of such member 32. During the period of dwell of the turret 33, the bottles in the chute 105 are free to move toward the holder 32 positioned at station A of the turret. However, prior to the movement of the turret 33, a stop member 106 is inserted between the bottle seated on the holder member 32 and the next succeeding bottle to prevent movement of the bottles not seated on the holder during the rotative movement of the turret 33 and until such turret again comes to rest with a succeeding holder 32 at the discharge end of chute 105. The means for so controlling the movement of the stop member 106 includes a lever 107 pivotally mounted intermediate its ends on a bracket 108 secured to the frame of the machine and one arm of which carries the stop member 106. The other arm of lever 107 is connected to the upper end of a vertically disposed link 109 which is connected at its lower end to an arm 110 of a bell crank lever pivotally mounted on a bracket 111 secured to the frame. The other arm 112 of such bell crank lever carries a cam roller 113 and one end of a spring 114 which is secured at its other end to a post secured to the frame and which maintains the cam roller 113 in engagement with the peripheral cam surface of a cam 115 mounted on the driving shaft 104. The cam 115 is formed to operate the mechanism connecting such cam with the stop member 106 to accomplish the above described movements of such stop member 106.

As can be seen more clearly in Fig. 3 of the drawings, the supporting members 32 are each provided with a plurality of air channels 117 which extend from the seating surface of such member to a chamber 118 formed in the head of such member. The chamber 118 of such member while at stations A, B and C and during the travel of such member from station A to station C is in communication with a semi-annularly shaped chamber 119' formed between the shaft member 119 and the hub 81 of the turret 33. The chamber 119' is connected through passageways in the member 119 and by a hose 120 to a suction motor 121 adapted to provide at the seating surfaces of the member 32, a suction sufficient to hold the bottles delivered at station A to such seats while the turret rotates from station A to stations B and C, but not strong enough to prevent the table 46 and belt 65 from removing such bottles from the holders when they arrive at station C. Inasmuch as the chamber 119' does not extend between stations C and A, the members 32 will be sealed off from the vacuum system while they are traveling from stations C to D and D to A, so that though they are not carrying bottles during such portions of their travel, there will be no loss of vacuum.

While it is believed that a clear understanding of the operation of the several mechanisms described, will have been obtained from the foregoing, it is believed advisable to further point out that in the operation of the machine, the step-by-step movements of the turret will successively bring each of the four holders 32 to stations A, B, C and D where the operations hereinabove described will be performed during the periods of dwell of the turret 33. Thus, during each period of dwell, a bottle will be fed to the holder positioned at station A, a label will be delivered by the suction head 11 to the bottle positioned at station B and partially affixed thereto by the pressure device 12, and the bottle with its partially secured label delivered at station C will be removed by the table 46 and belt 65 which will wrap and secure the entire label to the bottle while advancing the latter to the discharge chute 45. At station D during the period of dwell of the turret 33, the latching member 96 will engage with a recess in the latching wheel 98 to lock the turret 33 in its position of rest. Prior to the next movement of the turret 33, the latching member 96 will be withdrawn from its locking engagement with the latching wheel 98 and the stop member 106 will move up between the end bottle seated on the holding member 32 and the next succeeding bottle to prevent discharge of the bottles from chute 105 while the turret 33 is in movement.

It will be understood by those skilled in the art that while we have hereinabove described and illustrated a preferred embodiment of our invention, various changes and modifications may be made therein without departing from the spirit of the invention or the scope of the appended claims.

We claim:

1. In a labeling machine, the combination of an article supporting means *for sustaining an article thereon and including means for maintaining the article sustained in an at rest position on said supporting means,* means for partially securing [a] *an adhesive* label to an article [carried] *sustained* by said supporting means *and held in an at rest position thereon by said maintaining means,* and means for removing the article from said supporting means *against the tendency of said maintaining means to hold it in sustained position thereon* and for completing the attachment of the label to the article *after the article has been removed from said supporting means,* said removing and attaching operations being accomplished by the same means.

2. In a labeling machine, the combination of an article supporting means, means for depositing a label on an article carried by said supporting means, means for partially securing the label to the article *carried by said supporting means,* and means for removing the article with its partially secured label from said supporting means, said last mentioned means being constructed to complete the attachment of the label to the article soon after the removal thereof from said supporting means.

[3. In a labeling machine, the combination of an article supporting means, means for depositing a label on an article carried by said supporting means and for partially securing the label to the article discharge means for removing the article with its partially secured label from said supporting means, said discharge means being constructed to complete the attachment of the label to the article while carrying the latter from said supporting means to a point of discharge.]

4. In a labeling machine, the combination of supporting means provided with an article supporting seat, means whereby suction is made effective at said seat for maintaining articles in place thereon, means for depositing and securing a label to an article on said seat, and gripping means for removing the article with the label attached thereto from said seat against the force of the applied suction and for carrying the article to a point of discharge.

5. In a labeling machine, the combination of supporting means provided with a seat for [accommodating] *sustaining* an article to be labeled, *means associated with said seat for maintaining the article sustained in an at rest position relative to said seat,* means for depositing [a] *an adhesive* label on an article *sustained in an at rest position on said seat by said retaining means, means* [carried by said supporting means and] for partially securing the label to the article *sustained on said seat by a pressing action,* and means [for completing] *contactable with the article having the partially secured label on said seat and operable to positively remove the article from said seat and to complete* the attachment of the label to the article, while carrying the latter from said supporting means to a point of discharge.

6. In a labeling machine, the combination of supporting means provided with a seat for *sustaining* [accommodating] a rounded article to be labeled, *means associated with said seat for maintaining the article sustained in an at rest position relative to said seat,* means for securing one end of a label to an article *sustained in an at rest position on said seat by said maintaining* [carried by said supporting] means leaving the other end of the label free, and means *for removing the article with the label secured thereto from its seated relation on said seat against the tendency of said maintaining means to maintain the article in seated condition and* for completing the attachment of the label to the article while rolling the latter from said supporting means to a point of discharge.

7. In a labeling machine, the combination of article supporting means, means for securing a label to an article carried by said supporting means, and means for removing the article from said supporting means including a pair of elongated members arranged in spaced parallel relation and at least one of which is movable in the direction of its length away from said supporting means, and means for moving said members as a unit to bring one end thereof into engagement with two opposed surfaces of an article positioned on said supporting means.

8. In a labeling machine, the combination of article supporting means, means for securing a label to an article carried by said supporting means, and means for removing the article from said supporting means including an elongated support, a movable belt arranged in spaced parallel relation to said support, and means for moving said support and belt as a unit to bring one end thereof into engagement with two opposed surfaces of an article positioned on said supporting means.

9. In a labeling machine, the combination of article supporting means, means for securing a label to an article carried by said supporting means, means for moving said supporting means from the label applying position to a place of discharge, and means at said discharge position for removing the article from said supporting means and including an elongated support, an endless belt arranged in spaced parallel relation to said support, and means for removing said support and belt as a unit toward said supporting means to bring one end thereof into engagement with the opposite sides of an article positioned on said supporting means.

10. The combination defined in claim 9 in which said elongated support is a table having the surface opposed to said endless belt provided with frictional material and in which said last mentioned means includes a pivoted lever, means for connecting said table and belt to said lever, and cam operated means operably connected to said lever to cause the latter to move said table and belt toward and away from said supporting means.

11. The combination defined in claim 9 in which said elongated support is a table having the surface opposed to said endless belt provided with a layer of rubber material, and includes a rigid guide plate arranged to maintain the portion of said endless belt opposed to said table in predetermined spaced parallel relation against forces tending to separate them, and in which said last mentioned means includes a pivoted lever, means yieldably and adjustably supporting said table on said lever, means adjustably supporting said belt on said lever, and means operatively connected to said lever to cause the latter to move said table and support toward and away from said supporting means.

12. The combination defined in claim 9, including a fixed motor, a chain sprocket connected to said motor, a chain sprocket connected to said endless belt, an endless chain mounted on said sprockets and having a length substantially greater than the distance between said sprockets, idler sprockets engaging said chain intermediate said first and second mentioned sprockets, movable means supporting said idler sprockets, and yieldable means connected to said movable means for maintaining said idler sprockets in engagement with said chain.

13. In a labeling machine, the combination of article supporting means, means for depositing a label on an article carried by said supporting means and including a movable carriage, a suction label carrying head pivotally mounted on said carriage, a suction connection leading to said suction head and a valve in said connection controlled by said head, and means for removing the article from said supporting means.

14. In a labeling machine, the combination of article supporting means for depositing a label on an article carried by said supporting means and including a movable carriage, a suction head having a label carrying surface, means mounting said head on said carriage for movement from a normal position under pressure applied to the label carrying surface thereof, a member on said carriage having a passageway connected with a source of suction, a valve intermediate said member and said suction head for controlling communication therebetween, said valve being controlled by said movable suction head, and means for removing the labeled article from said supporting means.

15. In a labeling machine, the combination of article supporting means, means for depositing a label on an article carried by said supporting means and including a movable carriage, a suction head having a label carrying surface, means pivotally supporting said head on said carriage for movement from a normal position under pressure applied to the label carrying surface thereof, a member on said carriage having a valve seat and a passageway connecting said valve seat with a source of suction, a valve member carried by the face end of said suction head and seated on said valve seat and a passageway in said valve member connecting said suction head with the passageway in said member when said valve member is seated on said valve seat.

16. The combination defined in claim 15 including a stop member adjustably mounted on said carriage for controlling the range of movement of said valve member and suction head, and means normally biasing said suction head to its normal position in which said valve member is seated.

17. In a labeling machine, the combination of article supporting means, means for depositing a label on an article carried by said supporting means, pressure means for developing applying pressure on a deposited label and including a block, a pair of pressure members pivotally supported on said block, yieldable means normally maintaining said members in spaced relation and adjustable means for varying the normal spaced relation of said members.

18. The combination defined in claim 17, in which said members have arcuately shaped shoes surfaced with rubber and together normally define an arc of a greater radius than the radius of the article to which the label is to be applied and are adapted to contract with a wiping action when applying pressure on a deposited label.

19. In a labeling machine, the combination of a rotatable turret having a plurality of article holders, means for feeding articles to said holders, means for depositing a label on an article carried by said holders, pressure means for securing the label to the article and means for frictionally engaging the labeled articles to remove them from the turret.

20. In a labeling machine, the combination of a rotatable turret having a plurality of article holders, means for feeding articles to said holders, means for interrupting the feed of the articles during the movements of the turret, means for depositing labels on the articles carried by said holders, pressure means for partially securing the labels to the articles and means for frictionally engaging the partially labeled articles to remove them from the turret and to complete the securing of the labels thereto.

21. In a labeling machine, the combination of a rotatable turret having a plurality of article holders, means for feeding articles to said holders comprising guiding means having a discharge end adjacent to the path of travel of said holders, a stop member insertable into the path of feed of the articles at a point spaced from the path of travel of the holders a distance substantially equal to the transverse dimension of an article and means for actuating said stop member in timed relation to the rotative movements of said turret.

22. In a labeling machine, the combination of of a rotatable turret, a plurality of article holders on said turret each having an article seat, means for applying suction at said seats, means for feeding articles to said holders, means for applying labels to the articles carried by said holders and means for frictionally engaging the labeled articles to remove them from the turret against the pull of the applied suction.

23. In a labeling machine, the combination of a rotatable turret, a plurality of article holders on said turret, means to rotate said turret to move said holders from station to station, means at one end of said stations for feeding articles to said holders, means at another of said stations to apply labels to the articles carried by said holders, means at a third station to remove the articles with the labels applied thereto from said holders and means for locking said turret during its periods of dwell.

24. The combination defined in claim 23 in which said last mentioned means comprises a latch wheel secured to said turret for rotational movement therewith, a latch member engageable in locking relation with said latch wheel at a plurality of predetermined positions thereof, and means for actuating said latch member in timed relation to the periods of dwell of said turret.

25. In a labeling machine, means for attaching an edge portion of an adhesively coated label to an article at a predetermined station of the machine, article carrying means for bringing the article into operative relation with the label attaching means at said predetermined station and for carrying the article from such station to a succeeding station of the machine with the attached portion of the label in a leading position with relation to the direction of travel of the article and with the unattached portion thereof in a trailing position with relation to such direction of travel, and means located at such succeeding station of the machine for completing the application of the label to the article while removing the article from said carrying means, said last mentioned means including a pressure member and means for rolling the article against said pressure member.

[26. In a labeling machine, means for attaching an edge portion of an adhesively coated label to the article while the latter is held in a stationary position, and means for completing the attachment of the label while the article is moved about one of its axes.]

27. In a labeling machine, *conveying means for sustaining an article in its travel to a label applying station and including means for maintaining the article seated in an at rest condition relative to said conveyor during such travel, means for causing said conveyor to come to rest when the article is delivered to said label applying station,* means *at the label applying station* for *adhesively* attaching a portion of an adhesively coated label to an article *sustained by said conveyor in an* at rest *position during a pause in the movement of said conveyor,* and means *for positively removing the article from the seated condition in which it is sustained on the conveyor by said retaining means and* for moving the article about one of its axes and at the same time completing the application of the label.

28. In a labeling machine, means for attaching a portion of an adhesively coated label to an article at rest, means for moving said article in an at rest condition with the unattached portion of the label in trailing position to another portion of the machine, and means separate from said article moving means and located at said other portion of the machine for completing the application of the label while moving the article about one of its axes.

29. In a labeling machine, *conveying means for sustaining an article in its travel to a label applying station and including means for maintaining the article seated in an at rest condition relative to said conveyor means during such travel, means for causing said conveyor means to come to rest when an article is delivered to said label applying station,* means *at the label applying station for adhesively* attaching a portion of an adhesively coated label to an article *sustained by said conveying means in an* at rest *position during a pause in the movement of said conveying means,* and labeling means, including relatively movable pressure means, for *positively removing the article from the seated condition in which it is retained on the conveying means by said maintaining means and for* completing the application of the label to the article while imparting motion to the latter.

30. In a labeling machine, means for carrying an article while at rest thereon to a plurality of labeling means, labeling means for applying to such article, while in an at rest position on said carrying means, a portion of an adhesively coated label so that the attached portion of such label is in a leading position with relation to the direction of travel of the article and the unattached portion thereof is in a trailing position with relation to such direction of travel, and a succeeding labeling means for rotating said article to complete the application of the label thereto.

31. In a labeling machine, means for carrying an article while at rest thereon to a plurality of labeling means, air controlled labeling means at one point in the travel of such article for applying to such article, while in an at rest position on said carrying means, a portion of an adhesively coated label so that the attached portion thereof is in a leading position with relation to the direction of travel of the article and the unattached portion thereof is in a trailing position with relation to such direction of travel, and labeling means at a succeeding point in the travel of such article for completing the application of the label by a rotational movement of the article.

32. In a labeling machine, means for carrying an article while at rest thereon to a plurality of labeling means, air controlled means for applying to such article, while in an at rest position on said carrying means, a portion of an adhesively coated label so that the attached portion of such label is in a leading position with relation to the direction of travel of the article and the unattached portion thereof is in a trailing position with relation to such direction of travel, and a succeeding labeling means including pressure means for completing the application of the label by a rotational movement of the article and with the exercise of pressure.

*33. A machine for applying adhesive labels to cylindrical objects comprising means for feeding the objects, receiving means for receiving the objects consecutively one at a time from said means said receiving means being constructed and arranged to sustain an object during its travel from said feeding means to a label applying station and including means for maintaining the object in an at rest position with respect to said receiving means in such travel to the label applying station, means at the label applying station for adhesively applying an adhesive coated label to an object on the receiving means at one part of its length while such object is sustained by said receiving means in an at rest position by said maintaining means, means providing a plane surface, and means for rolling the object off the receiving means against the tendency of said maintaining means to hold it in position thereon and along the said plane surface thereby to roll the label on the object and apply it firmly thereto.*

*34. A machine for applying adhesive labels to cylindrical objects comprising means for feeding the objects, a movable rest which receives the objects one at a time from said feeding means, means associated with said movable rest, said movable rest and said associated means being constructed and arranged and coacting to sustain an object in an at rest condition with respect to such rest during its travel from said feeding means to*

*the point of label application, a label applying device operatively associated with said rest by which an adhesive coated label is adhesively applied to the object on the rest at one part of the length of the label and while the object is sustained in an at rest condition by the coaction of said rest and associated means, means providing a plane surface, and an endless conveyor belt spaced from and parallel to the plane surface, the said rest after application of the label to the object thereon being moved to bring the object into contact with the endless conveyor which rolls the object off the rest against the tendency of said maintaining means to retain it thereon and along the plane surface.*

*35. A machine for applying adhesive labels to substantially cylindrical articles, said machine having a label applying station, means at said station for moving a label into adhesive contact with an article at the station, a conveyor for sustaining successive articles through a substantial distance and to and beyond the label applying station, means on said conveyor for maintaining the articles sustained thereby in an at rest condition with respect to the conveyor in their travel to and beyond the label applying station, means operable to cause said conveyor to come to rest at said label applying station, whereby during the attachment of the label at such station the article is wholly stationary, apparatus beyond the station movable in a direction to roll each successive article that comes from said station in the direction of travel of the articles through the machine, and a contact pad across which the article is rolled by said apparatus to secure the label firmly to the article.*

*36. A machine for applying adhesive labels to substantially cylindrical articles, said machine having a label applying station, means at said station for moving a label into adhesive contact with an article at the station, a conveyor for sustaining successive articles through a substantial distance and to and beyond the label applying station, means on said conveyor for maintaining the articles sustained thereby in an at rest condition with respect to the conveyor in their travel to and beyond the label applying station, driving mechanism for said conveyor operable to cause said conveyor to come to rest at said label applying station, whereby during the attachment of the label at such station the article is wholly stationary, an endless belt beyond the station movable in a direction to roll each successive article that comes from said station in the direction of travel of the articles through the machine, a contact pad across which the article is rolled by said endless belt to secure the label firmly to the article, and spring means maintaining a yielding pressure of the articles against said endless belt as they are rolled by the latter along said contact pad.*

*37. A labeling machine comprising a conveyor for holding articles that are to be labeled in spaced relation thereon, a label applying station with means for moving a label into contact with an article on the conveyor, intermittent motion driving mechanism for the conveyor with means for stopping the conveyor for a limited period as each article reaches the attaching station, an endless belt beyond the station movable in a direction to roll each successive article that comes from said station in the direction of travel of the articles through the machine, a contact pad across which the article is rolled by said endless belt to secure the label to the article, and means for driving the endless belt continuously during the intermittent movements of said conveyor.*

*38. A labeling machine comprising a conveyor for holding articles that are to be labeled in spaced relation thereon, a label applying station with means for moving a label into contact with an article on the conveyor, an element having a plane surface at one side of the conveyor beginning at a location beyond the label attaching station and extending along a portion of the path of travel of the articles beyond the label applying station, an endless belt having a run extending in spaced, generally parallel relation to the plane surface of said element and movable in a direction to roll each successive article that comes from said station along the plane surface of said element, said element at its entry end having an inclined surface that extends to the plane surface thereof from a point spaced further from the rim of said belt than the plane surface thereof and with which the articles initially engage in their passage between said element and belt run, and said element having springs that hold the articles against such belt run with a yielding force as they roll along the plane surface of said element.*

References Cited in the file of this patent or the original patent

UNITED STATES PATENTS

| Number | Name | Date |
|---|---|---|
| 1,078,723 | Dodge | Nov. 18, 1913 |
| 1,315,737 | Milmoe | Sept. 9, 1919 |
| 1,404,068 | Swift | Jan. 17, 1922 |
| 1,510,091 | Lakey et al. | Sept. 30, 1924 |
| 1,882,659 | Aldrich et al. | Oct. 18, 1932 |
| 1,969,660 | McLaurin | Aug. 7, 1934 |
| 2,213,704 | Hesson | Sept. 3, 1940 |
| 2,344,185 | Tuthill | Mar. 14, 1944 |
| 2,424,540 | Bogoslowsky | July 29, 1947 |

FOREIGN PATENTS

| Number | Country | Date |
|---|---|---|
| 648,169 | Germany | Dec. 15, 1937 |